Patented June 17, 1930

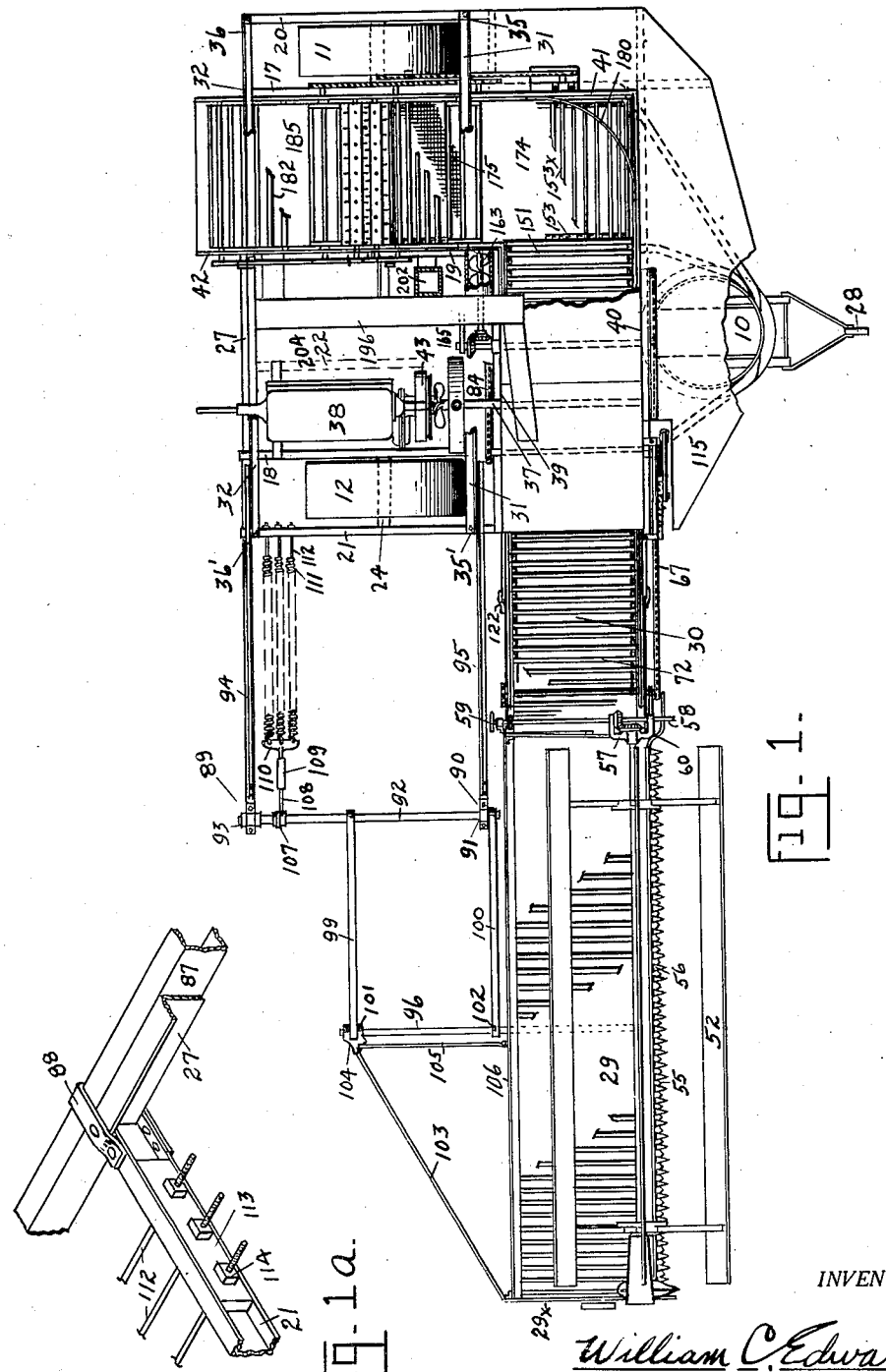

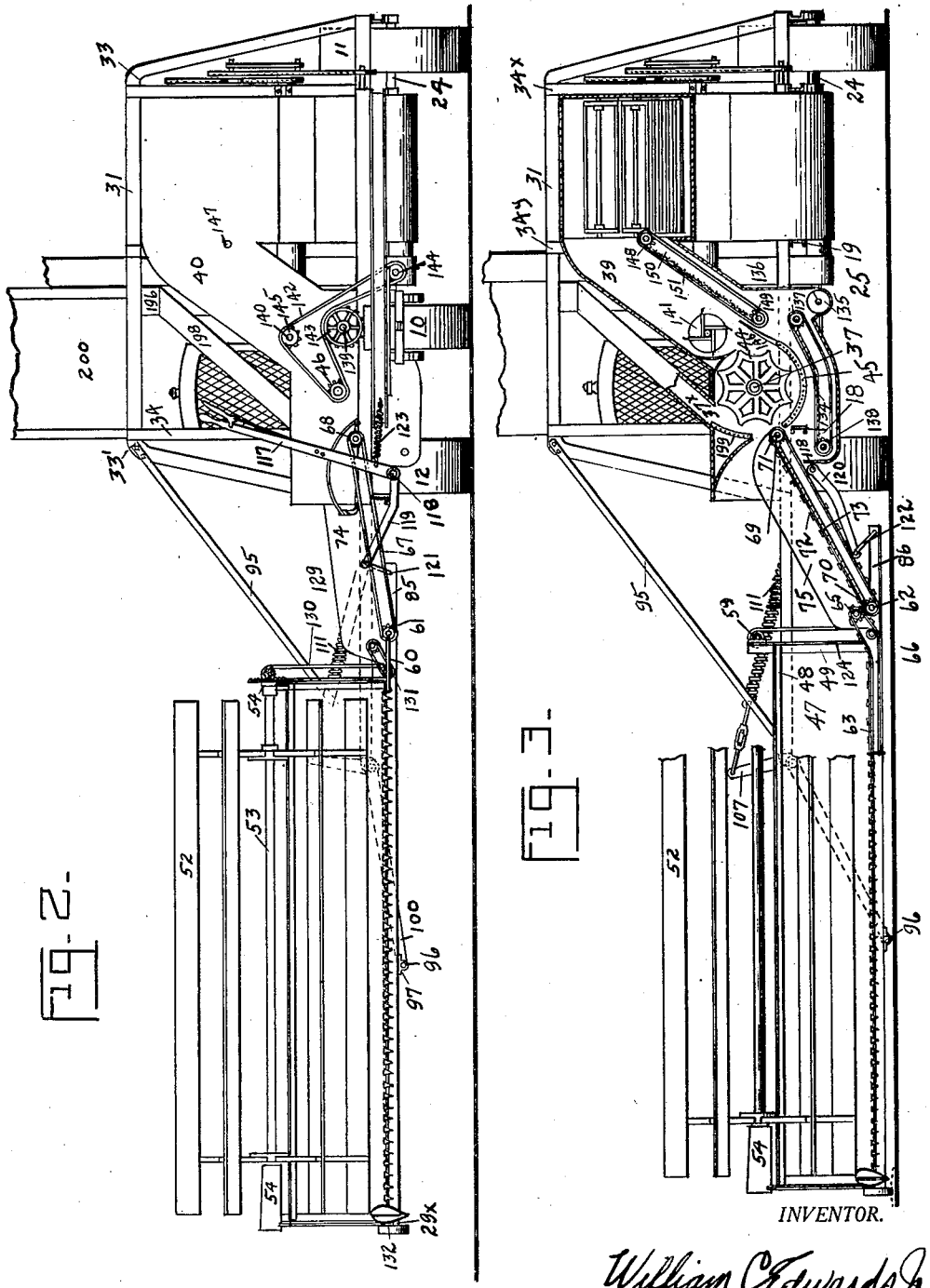

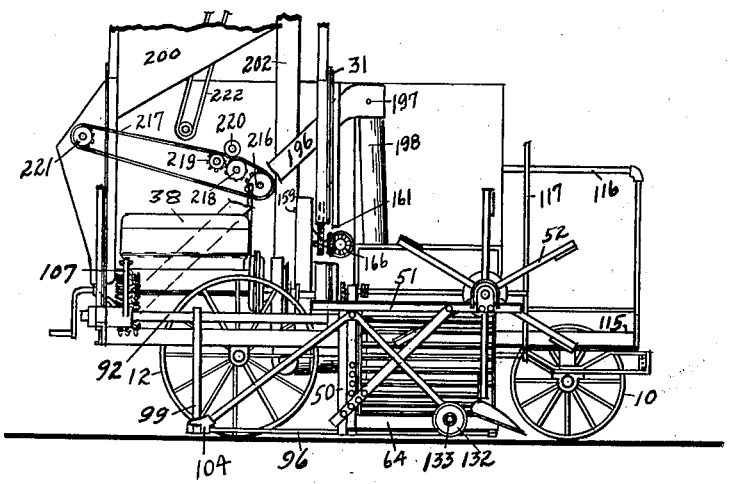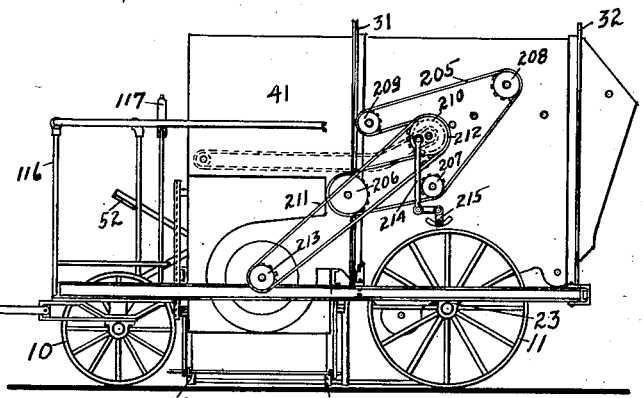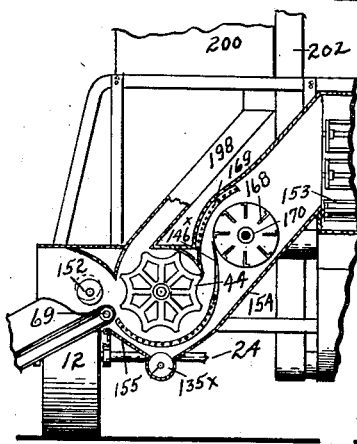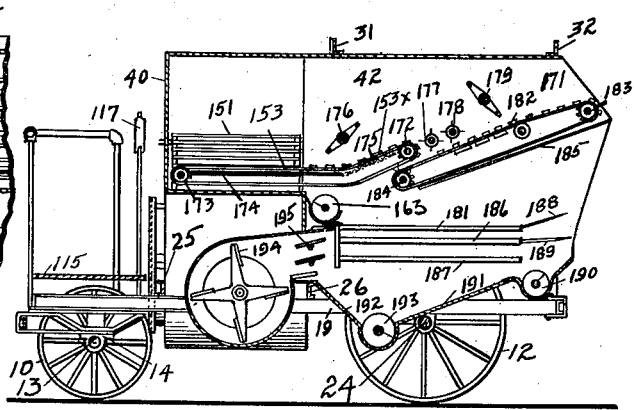

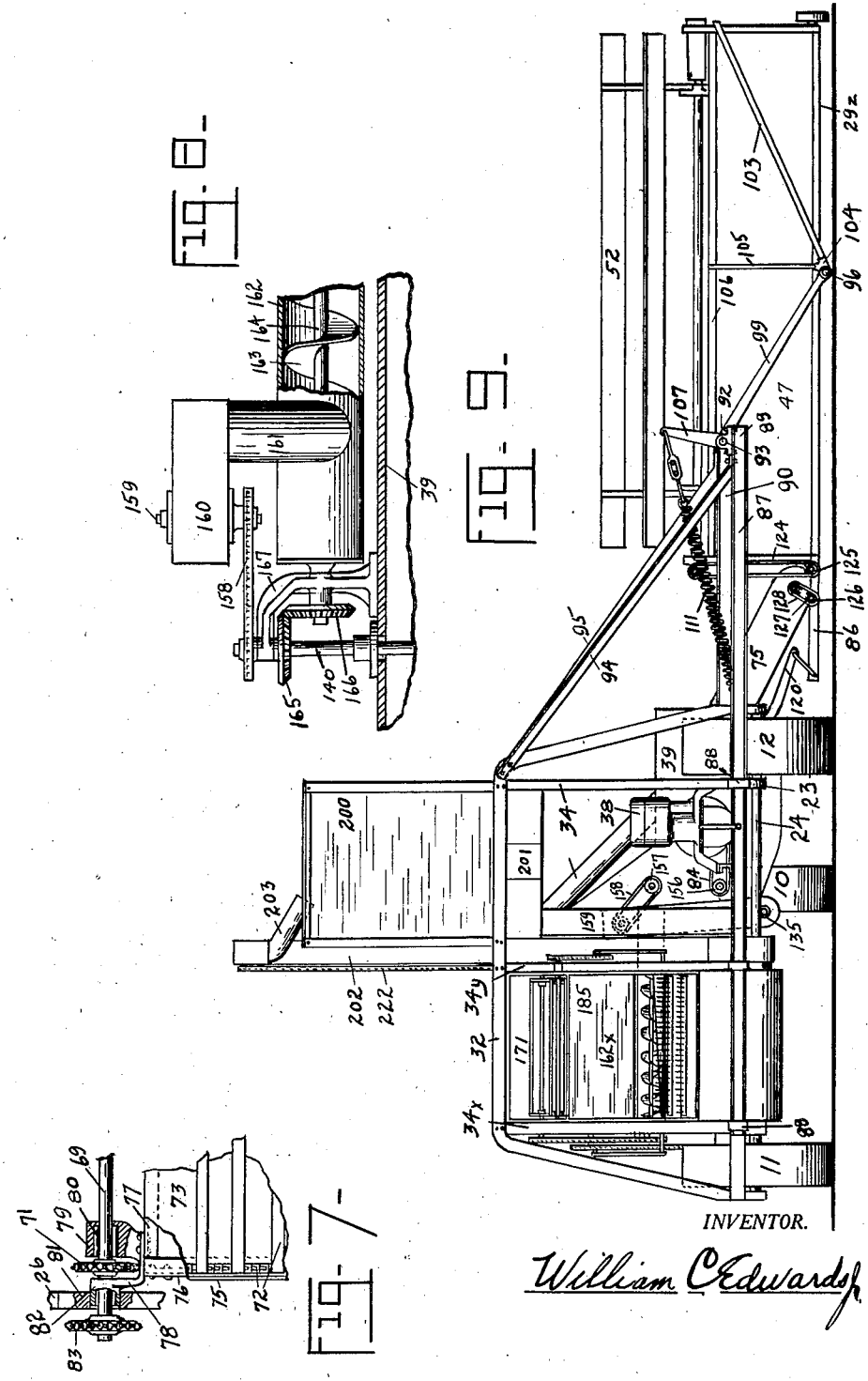

1,764,041

UNITED STATES PATENT OFFICE

WILLIAM C. EDWARDS, JR., OF KANSAS CITY, MISSOURI

COMBINATION HARVESTER THRASHER

Application filed May 16, 1927. Serial No. 191,943.

The invention refers to an agricultural implement generally known as a combine; a combine includes a harvester conveyor frame, provided with cutting mechanism extending transversely of the machine at the front of said frame, and a feeder housing at one end of and in receiving communication with said frame. Conveying and feeding mechanisms, such as platform canvas, raddles, spiral conveyors, beaters and the like, are employed in the frame and feeder housing for advancing harvested material to thrashing mechanisms for thrashing and delivery to separating mechanisms associated therewith, for separating and cleaning and for delivery of the grain to bins, wagon and the like for disposition or sale. The invention has several advantages, among which is; first, to provide a platform that is adjustably raised and lowered by lateral hinged movements, or so that the platform does not tilt at its forward edge. Second, to eliminate side draft; third, to cut the grain straw and travel it directly to a cylinder assembly for thrashing purposes and afterwards turn the straw at right angles to its prior travel before ejection from the machine. Fourth, to strip, elevate and advance harvested elements from harvester platform conveying means and distribute such elements upon a thrashing cylinder so as to reduce the possibility of choking the feeder housing or slugging the cylinder.

In the drawings; Fig. 1 shows a plan view of my composite machine, with parts removed to illustrate working elements. Fig. 1ª is a detail of the tilt spring attachment to the frame as seen in Fig. 1. Fig. 2 is a front view of the machine with the header platform in a raised position. Fig. 3 is a view similar to that seen in Fig. 2 with the platform lowered to its lowest cutting position, the front wall elements have been removed to show working elements of the machine. Fig. 4 represents a side elevation of the machine looking from the standing grain side of the machine. Fig. 5 is a side elevation of the stubble side of the machine. Fig. 3ª is a fragmentary view of an alternate arrangement of cylinder, concave, impeller, auger and allied assemblies to that seen in Fig. 3. Fig. 6 is similar to the view seen in Fig. 5, with however the outer wall of the separator removed to disclose internal parts and with the header platform raised from the lowered position seen in Fig. 5. Fig. 7 is a detail of the pivotal support of the feed house elevator and allied elements. Fig. 8 is a detail of the bevel gear assembly, beater shaft, distributing auger and first elevator elements. Fig. 9 shows a rear view of the composite machine.

Similar numerals of reference indicate corresponding parts throughout all the figures of the drawings.

Referring to the drawings; a front caster wheel 10, a land wheel 11 and a grain wheel 12 carry the frame of the machine. The caster wheel 10 is preferably mounted on the axle 13 carried in supports 14 supporting frame elements 15 carrying a turntable device 16 suitably supporting the forwardly extending frame elements which may be channels 17, 18 and 19. These channels together with other channels such as the outer pair 20 and 21 and an intermediate channel 22 are preferably supported by members 23 upon the main or rear axle shaft 24. The wheels 11 and 12 are comparatively wide spread and the paired channels 18—21 and 17—20 bear on either side of the axle 24 to more properly load the respective wheels 12 and 11 as will be readily understood. To further stiffen the frame structure I employ the two transverse channels 25 and 26 and the transverse angle 27 which lead from the outer channel 20 to the inner channel 21 upon which they are supported. These transverse elements are likewise supported upon and bolted to the inner channels 17, 19, 22 and 18. Thus the horizontal framing elements of the machine forms a very stiff arrangement and is properly tied to the axle 24 by parts such as 23. Upon this frame as a base carried by the supporting wheels 10, 11 and 12, I carry my entire machine and added loadings. It will be noted that the forward ends of the channels 18, 19 and 17 may be properly bent and tied to the upper ring of the turntable assembly; thus, when the center of mass of the machine is once obtained, this turntable is so fixed into the arrangement of parts that the tongue for tractor or horse pull as seen at 28 may be positively arranged to be in the line of draft, also the grain bin, if used, would in that event be balanced upon both sides of the line of draft so that more or less grain in the bin would have no effect upon the line of draft.

The thrasher-separator sets directly upon the frame elements of the machine; the body of the thrasher-separator is in the form of an L-shaped passage which includes a forward passage transversely positioned to the line of draft and supported intermediate the cross channels 25 and 26; and, a rearwardly extending passage supported by the channels 17 and 19 parallel to the line of draft. Straw impelling and thrashing mechanisms function within chambers defined within the body of the thrasher, as seen in Figs. 3 and 3ª, and in a receiving relationship to the conveying and feeding mechanisms of the harvester. At 29 is a harvester conveyor frame carrying cutting mechanisms and provided with a feeder housing at one end of and in communication with said frame, said housing having an outlet communicating to a chamber. Rotatably mounted within this chamber is a shaft arranged in parallelism to said outlet. This shaft carries an impeller 44 in a direct receiving and combing relation to any selected straw advancing means as employed on the harvester frame and feeder housing.

Referring to Figs. 1 and 2 the truss bridging comprises a pair of top chord members 31 and 32, the said members being horizontally disposed as seen in Figs. 2 and 6 being bent as at 33—33' downwardly so that the ends bolt to the respective abutments 20 and 21 as at 35—35' and 36—36'. Posts 34, 34ˣ and 34ʸ attach to chord 31 and are bolted to the channels 18, 17 and 19. Similar posts 34, 34ˣ and 34ʸ bolted to the rear chord 32 also bolt to the channels 18, 17 and 19. Thus the trusses 31 etc. and 32 etc., as allied with the horizontal frame and axle elements furnish a very rigid and substantial structural support for the harvester elements and for carrying the cantilever elements of the machine.

Combines generally have been of considerable depth due to mounting the motor and feeding chamber forward of the main and cleaning elements. While the cylinder shaft 37 is aligned in parallelism to the line of draft and might be connected by suitable driving means and universal joints to the power take off of the pulling tractor, I prefer using an auxiliary motor 38 which is carried upon the channels 18 and 22 or so that the motor sets transverse to and above the rear axle 24 and between the wheels 11 and 12. Suitable roller or ball bearings in proper mountings support all the rotating shafts throughout my machine. These mountings may be in the wall elements 39—40 and 41—42 of the passages, or upon suitable angle or other structural supports where illustrated. The main shaft 37 may be driven by a belt, chain or power takeoff from the prime mover, but by preference is detachably engaged by means of the clutch 43 with the motor 38. The impeller 44 is of the rasp or beater bar type of cylinder, though the peg cylinder might be used; I prefer to employ eight rows of beater bars or combs, though a lesser number may be used if so desired. I also prefer to use a perforated concave or grate 45 arranged below the rasp type cylinder, though a non-perforated plate might be used, or a spiked concave employed, if desired. The sprocket 46 on the end of the main shaft 37, Fig. 2 as illustrated is the driver for all motor driven elements of the composite machine as will be later described.

The header platform 29 is at all times carried without the objectionable forward tilting common to platforms that pivot from an axle element arranged in parallelism with the platform at the rear thereof. At 47 is the back screen of the header supported by braces 48, 49, 50 and 51. At 52 is the reel on reel shaft 53 carried in suitable bearings at its end such as 54. This reel is adjustable as in common practice. A sickle 55 runs in the guards 56 carried by the platform 29 as customary. The reel shaft 53 is driven by the bevel gear assembly 57 and shaft 58 as driven by sprocket 59. The sickle 55 is driven by the pitman 60 eccentrically actuated by the driven sprocket 61 on the transverse shaft 62 which is the pivotal axis of the hinged supporting connection to the platform 29. It is customary in combination harvester thrashers to employ some straw conveying means behind the cutting mechanisms of the harvester platform for advancing the harvested elements to a feed house or feeding chamber; among the conveying means so employed may be mentioned the spiral conveyor, the slatted raddle and the plaform canvas. The endless conveyor such as the platform canvas 63 leads around the end roller at 64 and the opposite end roller 65, Fig. 3 and back under roller 66. The sprocket 61 is driven by the chain 67 driven from sprocket 68 on the driven shaft 69; the shafts 69 and 62 are provided with sprockets such as 70 and 71 in pairs to carry the chains of the slatted traveling conveyor rake 72 running over the steel floor 73. If desired, the rake 72 may run the full length of the platform and eliminate the platform canvas 63. Walls 74 and 75 are provided as the sides of the feed house or feeding chamber on the element 30, so as to permit harvested straw to be advanced across the full face of the rotating impeller 44. The rotary impeller 44 is thus positioned close to the ground and in a direct receiving relationship to the straw conveying means of the harvester. In the usual header the elevator is pivotally supported from the platform. In my machine the platform hinges and depends from the frame by means of an intermediate pivotally hung element such as the member 30. The mounting seen in Fig. 7 may be considered as applicable at all four corners of the hinged element 30. To a side wall, for instance the wall 75 I attach a channel member 76.

A similar channel would be attached to the wall 74. These channels give strength and stiffness to the frame 30 and are braced by rigid cross members as indicated at 77. At the four corners would be placed a cast housing such as 78. The part 79 thereof carries the bearing 80 for the shaft such as 69. Upon the proper support such as 26 is a housing 81. A rounded end portion 82, through which passes the shaft 69, pivots in the housing 81. The sprocket 83 on shaft 69 is driven by chain 84. As previously mentioned a pivotal connection similar to that seen in Fig. 7 would apply behind the sprocket 68, Fig. 2 and at either end of the shaft 61, or so that the front Z-bar and rear angle elements 85 and 86 of the platform 29 are pivotally swung from such paired mountings 81—82 at the upper ends of the shaft 69. The shaft 69 is therefore a driving element for the header rotating elements and is in the axial alignment of the initial point of pivot of the depending frame 30 and to which the inner end of the platform pivots. Without some means of outer support the end of the platform at 29$^x$ would fall to the ground. One means of support may be the cantilever next described. In road travel it may be desirable to have road clearance hence I make my cantilever detachable. Also the header elements may be disconnected from the frame supports 25—26, and the assembled header elements suitably supported by truck means can be towed in the rear of the channel 22.

A channel such as 87 is slipped through hangers 88 attached to frame supports as in Figs. 1$^a$ and 9 and may also be bolted to the angle 27. This channel extends towards the standing grain side of the machine or to the point 89 as a cantilever. A companion channel 90 similarly anchored adjacent the channel 26 also outwardly projects to support a bearing 91 for the shaft 92 also supported in the bearing 93. Braces 94 and 95 respectively bolted to the top chords 32 and 31 bolt to the outer end portions of the beams 89 and 90. Thus a load applied to the bearing supports 91 and 93 by the shaft 92 would be carried by the cantilevers 89—90 and braces 94—95 or so that the top chords 31—32 would carry the stresses to the abutments on the supporting channel 20 or so that both rear wheels 11 and 12 receive and support such loadings. The purpose of this construction is to provide one means of supporting the outer end 29$^x$ of the header platform in a suitable manner just as the opposite ends of the bars 85 and 86 are supported by the pivotable channels 76 of the depending element. A shaft 96 parallel to shafts 62 and 69 is mounted in elements 97 and 98 beneath the platform 29 to support the overhanging portion 29$^x$ in a desired manner. The arms 99 and 100 are rigid to and outwardly project from the shaft 92 and pivotally connect to the shaft 96 as seen at 101 and 102. A tie brace 103 connects the upper end of angle 52 to the element 104. Also another brace 105 leads from the element 104 to the upper part 106 of the screen 47 framework. Rigid to the shaft 92 is an upright lever 107 and attached thereto is the link 108, turnbuckle 109, spring hanger plate 110, a plurality of long tension springs 111, each individual spring connecting to a rod such as 112 being threaded at its ends and supported by nuts such as 114 at a plate 113 carried by the angle 21. Tightening the turnbuckle, the springs 111 pull upon lever 107 to pivot shaft 92 and therefore the arms 99—100 to raise the shaft 96 and therefore the outer end 29$^x$ of the platform to offset gravity. It is obvious that added leverage can be imparted to the lever action at 107 should such be required. The operator of the combine may stand upon the platform 115 within the guard railing 116. He operates the lever 117 rigid to pivotable cross shaft 118 suitably supported from frame elements such as 25—26. Levers 119 and 120 rigid to shaft 118 carry links 121 and 122 pivotally connecting and supporting the bars 85—86 and therefore the platform 29. A tilt spring 123 also connects lever 117 to the frame. It is the intent that the operator may by shifting the lever 117 to the left from the position seen in Fig. 2 add to gravity to lower the platform against the spring tension, since he is assisted by gravity. While from the position seen in Fig. 3, the lever would be pulled to the right and the springs would assist to lift the platform against gravity. It will be seen that the springs are transversely arranged to the line of draft and also that the platform 29 as carried by the paired hangers 76—76 and 99—100 is swung outwardly or inwardly, by endwise movements of said platform transverse to the line of draft of the machine, from or towards the open end of the forward passage of the thrasher. Thus the platform 29 never can be tipped with its guards 56 closer to the ground than the rear edge 29$^z$; but, that whether up or down, the platform 29 should be substantially parallel to the ground level, thus when the reel is driven, the straw is properly thrown upon the canvas slatted conveyor 63 and transmitted at 65 upon the rake 72 and floor 73 and swept into the feeding chamber and delivered against the periphery of the impeller 44 without the likelihood that heads would possibly fall through the guards 56 to the ground as is the case in the tilted platform of prior art. The chain 124 driven by sprocket 125 on driven shaft 126 drives the reel through sprocket 59. Driven shaft 62 drives sprocket 127, chain 128 to drive the sprocket 129 on the shaft of the roller 65 and by chain 130 the sprocket 131 drives the shaft 126 for the prior reel drive mentioned above. At the outer end of the platform is a wheel rotatably mounted upon a spindle carried by the end of the platform 29ˣ.

In going over the field there will be times when if some sled runner means or means such as the small wheel 132 as carried by a spindle 133 were not available, the end of the platform 29ˣ would dig into the ground, while by providing this small wheel, normally carried as in Fig. 2, this end of the platform is properly carried by such wheel support when it possibly comes in contact with the ground as shown in the dotted position Fig. 3. The feed house may contact the shaft 118 in Fig. 3 the intent being to not permit the platform to drop lower than is advisable for cutting purposes.

The cylinder mechanism s and allied parts seen in Fig. 3 and in Fig. 3ª are alternate arrangements. The arrangement seen in Fig. 3 will be first described. In this design the attempt is made to accomplish the major portion of the separation of grains from harvested thrashed straw while passing through the first passage of the separator; this requires a drag conveyor 151 for elevating the thrashed straw and unseparated grains to discharge upon the rack 153 in the second passage of the separator. The design seen in Fig. 3ª eliminates the necessity of using the drag conveyor 151 to gain elevation of thrashed elements to the rack 153 and it also insures a properly driven and distributed flow of harvested elements to the thrashing cylinder 168, thus eliminating any tendency of the conveyed harvested elements to drag in the feeding chamber. The design seen in Fig. 3 should secure more separation in the first separator passage than the simpler design seen in Fig. 3ª, which contains fewer working parts. There is, however, no tendency of straw back-feeding in Fig. 3ª, as the straw is directly impelled upon the rack 153. Straw might hairpin the slatted raddle 151 and on being thrown off, at the base thereof, fall into and wrap the small auger 135; this is not desirable. The design shown in Fig. 3ª, besides being simpler than that shown in Fig. 3, is believed to have other advantages. The cylinder 44 in Fig. 3 must rotate at a proper thrashing speed; this high speed, while necessary for thrashing, tends to sometimes led to repel the incoming harvested straw as led to its periphery by the platform straw conveying means. Under certain straw conditions, such for instance as light fluffy straw, this tendency of the cylinder to repel, rather than to suck in the straw, occasions a retardation of the harvested straw flow; thus a jam occurs and the combine must be stopped to clear the feeding chamber. The impeller 44 in Fig. 3ª, however, need not travel at such a high speed; the main high speed cylinder 168 may be depended upon to do all or at least the major portion of the thrashing; this permits the impeller 44 to rotate at a proper speed so that its blades will best function to strip the straw away from the harvester straw conveying means, and obviate the straw jam previously referred to, while insuring a positive forced feed and elevation of the straw stream to the thrashing cylinder 168 higher up in the machine. Referring now to Fig. 3 beneath the concave 45 is a grain collection floor 134 which extends partially under the feed house and to the right thereof towards and over a rearwardly rotating auger 134. A slatted conveyor 136 carried by sprockets 137—138 sweeps any grain dropped upon said floor 134 into the auger 135. The shafts are rotated by chain and sprocket means not shown driven however from shaft 139. At 140 is the shaft of the beater 141. Off of the driving sprocket 46 leads the main roller chain 142. The cylinder Fig. 3 is traveling counterclockwise, the chain 142 leads around a face sprocket 143 to rotate the drive shaft 139 in a clockwise manner; thence the chain travels around the chain tightener sprocket 144, thence around the beater sprocket 145 and around sprocket 46. The beater 141 rotates counterclockwise. Finger elements 146 lead from concave 45. At 147 is an upper shaft carrying sprockets 148 in pairs, while paired sprockets 149 are arranged on shaft 139. At 150 is a screen or grating. A slatted chain rake 151 carried by the sprockets 148—149 is driven from the shaft 139. A roller 152 may be loosely mounted to compress and assist the straw in feeding to the rotating element 44. The straw, after being thrashed by the cylinder 44 and the concave 45 is ejected rearwardly over the fingers 146 and is beaten down by the beater 141 while the rake 151 carries it up the incline to eject it upon the cross conveyor 153. The grain not driven through the perforated concave 45 may drop through the fingers 146 or through the screen grate 150, if so it immediately finds its way into the auger 135. A sprocket 156 on shaft 139 drives the header drive chain 84. The beater shaft 140 at its outer end carries a sprocket 157 for driving the chain 158 to drive a sprocket on the first elevator head shaft 159. A bucket chain driven from shaft 159 within the elevator 160 engages and drives a sprocket on the shaft 135 to rotate the auger and raise the thrashed augered grain to the head 160 Figs. 8 and 9 where it is dumped through the chute 161 into the trough 162 of the distributing auger 163 whose shaft 164 becomes the main drive for the separator cleaning elements as follows. Upon beater shaft 140 is a bevel gear 165 which drives the bevel gear 166 keyed to auger shaft 164. A proper bevel gear case is shown at 167. In Fig. 3ª in lieu of the beater 141 I employ a cylinder having a plurality of angular bars 168 bolted to drum ends of the cylinder as mounted on a revolvable shaft similar to the shaft 140. By preference I rotate this cylinder 168 in a clockwise manner; an upper concave 169 is positioned over the cylinder 168. It will be noted that the shaft 37 is parallel with and much lower than the shaft of the cylinder 168. By means of the platform canvas 63 and rake 72, harvested straw is fed directly into the chamber of the machine housing the cylinder 44. Setting the cylinder 44 lower than the cylinder 168 permits the rake to travel at a much flatter angle than is customary. The cylinder 44 receives the harvested straw and acts as an impeller to elevate and drive the straw against the overshot cylinder and its concave for thrashing and distribution upon separator racks behind the cylinder 168. Small air inlets such as seen at 170 may also be advantageous during this function. If desired I may shift the motor 38 closer towards the separator wall, or so that the shaft of the cylinder 168 is detachably engaged by clutch means to the motor and to rotate in the same direction as the shaft 140 Fig. 3; in this event the concave 169, Fig. 3ª, would be placed under the cylinder 168 and the straw would be driven upwardly by the impeller 44 over the plate 146 for undershot thrashing by the cylinder 168 and expulsion into the separator.

The impeller 44 sets low down in the machine and may be larger in diameter than the thrashing cylinder 168 setting higher up in the machine. The straw conveying means, behind the cutting mechanism, advances the harvested straw to the feeding chamber and directly against the periphery of the rotating impeller 44. The bars or blades, of the impeller, strike downwardly into the conveyed straw and jerk it away from the straw conveying mechanism and carry it under the impeller 44 and over the curved plate 45 and then cast it off, at the rear of the impeller, for an upwardly impelled flow of said straw through the upwardly directing passage and for an impelled distribution of said straw against the thrashing cylinder 168. The curved plate 45 and finger plate 146ˣ are preferably perforated to pass grains to the floor drains 154 and 155 leading to an auger 135ˣ; however, as previously stated, the elements 45 and 146ˣ may be made as a solid plate, in which event the auger and floor drains would be eliminated since any grains would be impelled to the rack 153 for separation. This would permit the impeller 44 to be lowered still closer to the ground. Thus in Fig. 3ª it will be seen that the impeller 44 serves as a feeding regulator or rotary comb, the currying action of which causes the crop to flow uniformly and positively from the feeder housing to the cylinder 168, materially increasing the efficiency of the thrashing and reducing the possibility of choking the feeder housing or slugging the cylinder.

Referring to Figs. 4, 5, 6 and 9; the cross conveyor 153 comprises a pair of spaced apart chains connected by transverse slats 153ˣ and runs over paired sprockets on the driven shaft 172 and rollers on the shaft 173. Beneath the conveyor is the solid floor 174 terminating at 175 in a perforated floor element or screen 175. At 176 is a beater on a rotating shaft. At 177 and 178 are pickers on shafts that rotate each a little faster than the preceding element. They rotate clockwise, while shafts 176 and beater shaft 179 rotate counter clockwise. The flying grain and straw delivered from the first or transverse passage strikes dead against the wall 41, thus it is absolutely estopped from cylinder or beater actuation blowing it out the end of the rearward passage, its further travel upon the cross conveyor 153 is also subjected to a turning or sidewise roll produced by the transverse turn in direction as augmented by the traveling slats 153ˣ and the vertical curved plate 180 which acts as a deflector within the intersecting walls 40—41 above the cross conveyor 153. All the grain driven back by the wall 41 during the initial contact, by reason of its weight readily seeks exits through the turned loosened straw to drop to the floor 174 and is swept by the slats 153ˣ to and permitted to fall through the screen 175 and between the pickers 177 and 178 to the top chaffer 181. At 182 is another traveling straw carrier somewhat similar to the carrier 135 and runs over the sprockets 183 and 184 to deliver the thrashed and cleaned straw to the exit 171 where it is dropped to the ground or to a straw spreader if used. Some grain may drop through the slats 182 to the floor 185, which slopes towards the forward end of the chaffer 181 and to which the returning slats 182 act to push such grain as dropped to the pan 185. The distributing auger 163 has likewise brought the grain received from auger 135 to the rear of the chaffer 181, it will be noted in Fig. 9 that the face edge of the trough 162 slopes as at 162ˣ for a better and more even distribution and flow of the grain to the chaffer 181. Below the top chaffer 181 is the screen 186 and the lower sieve 187. Tailings may pass through the fingers 188—189 into the tailings auger 190. Cleaned grain falls to the floors 191—192 draining to grain auger 193.

An overshot fan 194 rotates on the fan shaft and drives air past windboards 195 for proper action upon the various sieves. Leading from the tailings auger 190 is a bucket tailings elevator 196 whose drive shaft 197 may be driven from a sprocket and chain assembly off of shaft 176. The tailings drop from elevator 196 through the chute 198 and passing the auxiliary concave 199 are rethrashed by upper bars of the cylinder 37ˣ, and then admitted into the feed house straw stream delivery, for a further thrashing and grain separation.

Supported upon the upper chords 31 and 32 is seen the grain bin 200 having a floor draining rearwardly through any form of chute 201 or so that the grain may be delivered to a wagon or truck drawn up in the rear of the machine. Grain is augered by the grain auger 193 to the grain elevator 202 and carried upwardly by a bucket chain for delivery through the chute 203 to the bin 200 or to the wagon towed in the rear of the machine in the event a bin is not used. If desired the grain may be sacked upon a platform at 204.

The main drive chain 205 leads around the sprocket 206 on shaft 164, tightener sprocket 207, beater sprocket 208, beater sprocket 209 and cross conveyor drive shaft sprocket 210. A chain 211 driven from the large sprocket 212 drives sprocket 213 for the fan drive. An eccentric on sprocket 212 carries a pitman 214 driving a bell crank 215 attached to and for shaking the screens 181—186—187. Upon the view seen in Fig. 4, the shaft 172 carries the sprocket 216 from which a chain 217 leads to drive picker shaft sprockets 218, 219. At 220 is a roller. The chain leads around sprocket 221 to drive straw carrier 182. The chain 222 driven by a sprocket on beater shaft 179 drives the bucket chain elements in elevator 202, and thereby the grain auger 193.

While I have shown the braces 94 and 95 and the cantilever elements 89 and 90 as members rigidly projecting from the frame and truss supporting elements of the machine, there might be conditions in which some flexibility of adjustment would be necessary such for instance in hill side cutting and where it might be desired to raise or lower the shaft 92 as a point for the outer pivot. This could be easily accomplished by changing the bolted position of the members 94 and 95 at 33' on the trusses 31 and 33 to accommodate raised or lowered anchored positions of the members 87. Then again other means other than the cantilever supported arms 99 and 100 might be used to carry or swing the outer end of the platform, the sole purpose being to carry the load of the platform back to the wheels 10, 11 and 12 while permitting the platform to be adjustably swung back and forth through the arc travelled by the pivotable hanger arms 76—76 and for the purposes of the invention. It is obvious, also, that the frame members 26 and 27 may be lengthened to support the bearings 91 and 93, thereby eliminating the members 87 and 90 and that the members 21 and 18 may be then moved outwardly on said members 26 and 27 or so as to position the wheel 12 closer to the end of the platform 29, which would be an advantage under uneven ground conditions.

It is apparent that the three elevators as employed are arranged in a very compact space and that the bin covering the motor protects it from the weather. If desired weights and beam elements may be used in lieu of the spring means 111. In any event the action would be similar, the flopping up and down so common in machines in which the springs or weighted beams are arranged in the line of draft or parallel thereto is eliminated by the arrangement of these elements transverse to the line of draft. In prior machines, the positioning of the springs and weights has permitted the forward guard and sickle elements to dig into the ground; in my invention, the springs acting at right angles to the direction of travel of the machine immediately cause the platform to recoil from ground contact. It is obvious that the flung positioning of the leveled platform might be accomplished from or by other elements other than the feed house within the scope of the invention. Such modifications may be employed as lie within the scope of the appended claims.

Having fully described my invention what I now claim as new and desire to secure by Letters Patent is:

1. In a machine of the class described, wheel, axle and supporting frame elements therefor; a thrasher having a forward portion intermediate lateral walls as a passage transversely positioned to the line of draft and having another passage intermediate longitudinal walls intersecting the first passage, and parallel to the line of draft a cylindered-concave assembly in the forward passage, a harvester mechanism beyond and arranged in prolongation of the forward passage; conveying means for delivering from the platform of the harvester, to and through the cylinder-concave; the outer longitudinal wall extending crosswise of the forward passage as a closure thereto and a cross conveyor in the second passage for changing the direction of straw travel in parallelism to the line of draft.

2. In a combination harvester-thrasher, wheel and axle means carrying a supporting framework; a thrasher, an element laterally hinged to and depending from the framework of the thrasher portion; a harvester platform having one end adjacent the thrasher arranged in prolongation of and hingedly connecting to the outer end of the hinged element and a second laterally operable hinged element, carried by said frame work, supporting the outer end portion of said platform; and means for adjusting the up and down position of the platform during and in association with parallel hinged movements of the paired hinged elements.

3. In a combination harvester-thrasher, a front caster wheel assembly, a pair of rear wheel assemblies and a frame carried by the wheels; said thrasher having a first passage housing operative cylinder-concave assemblies, said passage being transversely arranged to the line of draft and opening towards the harvester platform, a hinged element pivotally carried from frame means on the thrasher and pivotally connecting and supporting the inner end of the harvester platform; and a second element, also suspended from said frame and connecting and supporting the outer portion of the platform; and means for laterally moving said paired elements to give an adjustable endwise movement to said platform for vertical adjustment purposes.

4. In a combination harvester-thrasher, wheel, axle and frame elements as supports therefor; said thrasher having a first passage provided with concave and cylinder means, an auger and floor means leading thereto arranged beneath the concave; a second passage transversely connecting to the first passage, conveying means in both passages; cleaning mechanisms in the second passage; a feed house pivotally carried from frame elements forward of the cylinder; the platform of the harvester being pivotally suspended from the outer end of the feed house and in prolongation of the forward first passage of the thrasher and means for supporting the outer end of the platform from the frame of the machine comprising a second hinged element pivotally attached at one end to the said frame and at the other end to the outer portion of the platform and means for occasioning lateral hinged movements of the feed house element and the second hinged element in unison and for outwardly and inwardly swinging the platform to adjusted positions.

5. In a combination harvester-thrasher, a harvester platform and a first passage included between lateral walls of the thrasher arranged in series transverse to the line of draft of the machine and a wall element of a second passage parallel to the line of draft providing a closure to stop flying grain.

6. In a combination harvester-thrasher, wheel, axle and frame elements therefor; a first passage of the thrasher included between lateral walls thereof, a harvester platform and a hinged element pivotally linking the two, all arranged in operative sequence and transverse to the line of draft of the machine; and a second hinged element, laterally operable and in company with and in a paired parallel movement to the first hinged element as a hinged link between the frame and the outer portion of the platform for permitting adjustably controlled outwardly and inwardly flung movements of the platform with respect to the thrasher.

7. In a combination harvester-thrasher, wheel, axle and frame supporting means therefor; said thrasher having a forward passage housing cylinder, concave elements and a transverse passage housing cleaning mechanisms and straw carrying devices; an auger beneath the concave and floor drains leading thereto and elevator means associated therewith leading to other auger means delivering to the cleaning means; an engine in rear of the forward passage and at the side of the transverse passage, a truss frame work carried above the engine supported from the first frame supporting means; a feed house pivotally supported by frame elements forwardly swung from in front of the cylinder means and a harvester platform forwardly swung from pivotal means carried at the outer end of the feed house; means for supporting the outer end of the platform and for raising and lowering the platform from such pivotal supporting means.

8. In a combination harvester-thrasher, a front caster wheel, a pair of rear wheels, axle and frame means supported thereby; said thrasher having a forward passage and a transverse passage in intersecting relationship, cylinder-concave means within the forward passage; an engine behind the forward passage for driving the cylinder shaft and other elements of the machine; a harvester platform carrying cutting and conveying means; hinged element pivotally supported from the frame of the thrasher portion; said harvester platform being pivotally swung from the outer end of said hinged element in prolongation of the passage; and means associated with frame elements for supporting the outer end of the harvester platform and in association with the hinged element to permit raising and lowering of said platform through endwise movements thereof.

9. In a combination harvester-thrasher, a forward thrasher passage intermediate lateral walls transversely positioned with respect to the line of draft of the machine; a feed house comprising a rectangular frame carrying a feed rake, said feed rake delivering grain straw to concave and cylinder thrashing means operatively arranged within said passage; pivotal connections of said feed house to frame elements adjacent the opening to said passage; a harvester platform carrying cutting and conveying elements for delivering several grain straw to the feed house, and a hinged element pivotally linking intermediate the platform and the frame of the thrasher for supporting the outer end portion of the platform and pivotal connections at the inner end of the platform and outer end of the feed house for positioning said platform in prolongation to the forward passage of the thrasher, hinged movements of said feed house and said hinged element, in parallelism, operating to adjustably raise or lower said platform by endwise movements thereof.

10. In a combination harvester-thrasher having a thrasher element with a forward passage therein transversely arranged, intermediate lateral walls to the line of draft of the composite machine and housing cylinder-concave means with the cylinder shaft parallel to said line of draft, a harvester platform in an end to end arrangement with said forward passage portion and with a hinged element as a link connecting said platform to said thrasher, spring means associated with lever and pivotal means for outwardly and inwardly swinging the harvester platform in a direction transverse to the line of draft and for adjusted raised and lowered positions of said platform; said lever and pivotal means forming a companion hinged link intermediate the outer end of the platform and the thrasher and for moving laterally in parallelism with the hinged element for such platform adjustment purposes.

11. In a combination harvester-thrasher, a platform pivotally supported by a pair of laterally operable hinged elements from frame elements of the machine as carried by wheel and axle means associated therewith one of said hinged elements connecting to the inner end of said platform and the other hinged element connecting to an outer end portion of said platform; said platform being permitted raised and lowered movements due to outward and inward adjusted movements of pivoting means and for maintaining the same relative ratio of distance of the forward edge of the platform above the ground level as permitted the rear edge of said platform.

12. In a machine of the class described, wheel, axle and frame supporting means, a harvester platform including cutting and conveying means in operative arrangement thereupon, side walls for a thrasher passage in an end to end arrangement with the platform and both being positioned transverse to the line of draft of the machine; a hinged element supporting the inner end of the platform from the thrasher frame and a second hinged element likewise supporting the outer end of the platform from said frame, said paired hinged elements being laterally operable and providing means carried by the frame elements pivotally supporting the platform for endwise movements; and lever and spring means operatively carried by said frame transverse to the line of draft of the machine and for occasioning raised and lowered adjusted and controlled positions of the outwardly extending pivoted platform.

13. In a combination harvester-thrasher, lever and means associated therewith, as a counterbalance to gravity operatively connecting to supporting means of the machine and transverse to the line of draft thereof; and a pair of hinged elements, laterally operable in unison, connecting from the frame support of the harvester to opposite end portions of the platform and associated with said lever and associated means for adjustably raising or lowering the platform of the harvester by outward or inward movements of said platform in an endwise manner.

14. In a combination harvester-thrasher, a harvester platform, a hinged element and a forward passage intermediate lateral walls for housing cylinder-concave means, arranged in a series transverse to the line of draft of the machine; and a second hinged element, laterally operable in unison to the first hinged element and lever and means associated therewith, as a counterbalance to gravity, operatively connecting to frame supporting means and to pivotal means on the harvester platform; movements of said lever train, transverse to the line of draft, causing endwise raised or lowered movements of said harvester platform and to maintain a relative distance of the forward and rear edges of said platform, from the ground level, at such adjusted positions.

15. In a combination harvester-thrasher, a front caster wheel assembly and a pair of rear wheel assemblies carrying frame elements; a thrasher having a forward passage portion and a second passage transverse thereto; a feed house pivotally positioned forward of the first passage and a harvester platform pivotally depending from the feed house; said platform, feed house and first passage being arranged transverse to the line of draft of the machine and the second passage being arranged in parallelism to the line of draft; cutting means and conveying means on the platform for delivering severed grain straw in a sidewise relationship to the feed house conveying means and from that to the gap spacing between cylinder-concave means in the forward passage and with the heads of the grain straw in contiguous relationship and for thrashing operations while so maintained; thence a conveyance of conveyed thrashed grain straw against a wall closure of the second passage to stop flying grain, thence a conveyance in parallelism with the line of draft of the machine; floor drains and an auger assembly arranged beneath the cylinder-concave as a collector for grain thrashed at the cylinder and ejected from the straw stream prior to striking the wall closure; elevator means leading from the auger; a distributing auger transverse to the first auger receiving from the elevator means; straw carrier and beater means in the second passage for ejecting the refuse from the machine and for separating and dropping grains from the straw stream rearward of the distributing auger and cleaning means collecting such grains and receiving other grains from the auger assemblies for cleaning treatments and a second element pivotally depending from the thrasher frame in parallelism to the feed house and hingedly supporting the outer end of the platform and for deliveries as desired; and means for adjustably raising or lowering the harvester platform by endwise pivoted and supported movements thereof.

16. In a harvester-thrasher, including a front caster wheel assembly, and a pair of rear wheel elements carrying axle and frame supporting means; a thrasher and a harvester supported upon the frame carried by said wheels, a motor and a grain bin covering the motor carried above the rear portion of the frame intermediate the rear wheels; the distribution of the constant load of the machine being to center the line of draft through the front caster wheel assembly, and to balance added loadings within the grain tank upon either side of said constant line of draft.

17. In a machine of the class described, a thrasher, a vertically movable harvester platform arranged in prolongation of the passage housing the cylinder of the thrasher and means including a hinged element and another hinged element, each pivotally supported at the upper end from frame elements and linked at the lower end to elements associated with the platform and whereby swinging lateral movements of the paired sets of elements in unison causes inward or outward swung movements to the supported harvester platform.

18. In a machine of the class described, a thrasher and a harvester; the thrasher having wheel, axle and frame supporting means; and a pair of frame elements pivotally attached to the thrasher frame; both sets of frame elements having a lateral movement in parallelism and attaching at their lower ends to means associated with the harvester platform and for permitting endwise swung movements of the platform to accommodate desired adjusted heights for the cutting mechanism and to maintain a relative equality of the forward and rear edges of the platform above the ground in conformity thereto.

19. In a harvester-thrasher, a harvester platform carried from the frame of the composite machine by means of a pair of laterally operable hinged elements of equal length between points of hinged connection at the frame and at the platform.

20. In a harvester-thrasher, a harvester platform subject to endwise lateral adjustment movements and a pair of hinged elements of equivalent lengths, the upper end of each element hinging to the main frame of the machine and with their lower ends hingedly connecting to opposite ends of the platform.

21. In a machine as described in claim 3; and a second passage transversely disposed to and connecting with the first passage and straw conveying means in the second passage for receiving thrashed elements from the first passage and for changing their direction of travel at right angles to their prior travel upon the platform and in the thrashing first passage; and separating and cleaning mechanisms in the second passage.

22. In a machine of the class described; a harvester conveyor frame, a feeder housing at one end of and in communication with said frame, said housing having an outlet, and an impeller chamber in direct communication with said outlet; a thrashing chamber, including thrashing mechanism, above and beyond the impeller chamber and in direct communication therewith and a separator; conveying means on the harvester frame for advancing harvested material longitudinally of the frame into the feeder housing and means in the feeder housing for advancing such material through the outlet to the impeller chamber; an impeller shaft journaled in the impeller chamber and in parallelism to the outlet of the feeder housing and an undershot impeller secured to the shaft; a cylinder shaft journaled in the thrashing chamber in parallelism with, above and beyond the impeller shaft and a thrashing cylinder secured to said shaft; the impeller constituting rotary means for combing the advancing material and for elevating and regulating the flow of such material into the thrashing chamber and from which it moves under actuation of the thrashing cylinder into the separator.

23. A combination harvester, thrasher and separator including cutting mechanism, a harvester conveyor frame at the rear of and in direct receiving communication to the cutting mechanism, a feeder housing at one end of and in a direct receiving communication with the harvester frame and an impeller chamber in direct receiving communication with the feeder housing; a conveyor and feeding mechanism for advancing harvested material upon the harvester frame into the feeder housing and for thence ejecting said material into the impeller chamber; a thrashing cylinder above, beyond and in direct receiving communication with the impeller chamber and trashing mechanism therein including a rotary cylinder; a rotary undershot impeller beyond the feeder housing and within the impeller chamber for combing the material as ejected from the feeder housing against the periphery of said impeller and for elevating and regulating the flow of said material into the thrashing chamber, and a separator in direct communication with the thrashing chamber for receiving thrashed materials expelled therefrom.

24. A combination harvester, thrasher and separator including a harvester conveyor frame and a feeder housing having an outlet, cutting mechanism extending transversely of the machine at the front of said frame; an impeller chamber in receptive communication with said outlet, an undershot impeller rotatably operable within said chamber; a conveyor on the frame at the rear of and in a direct receiving relation to the cutting mechanism and for advancing harvested material into the feeder housing and through its outlet for distribution upon and across the peripheral face of the impeller; a thrashing chamber above and beyond the impeller chamber in direct communication with the separator and thrashing mechanism in the thrashing chamber; a passage communicating from the feeder housing outlet under the impeller and upwardly to the thrashing chamber; said impeller functioning as a rotary comb for stripping harvested elements ejected from the feeder housing and for elevating and regulating the flow of said materials into the thrashing chamber.

25. A combination harvester, thrasher and separator including a main frame, a subframe hinged to the main frame, means on the main frame for raising and lowering the subframe; cutting mechanism extending transversely of the machine at the front of the subframe, a feeder housing provided with an outlet and in receptive communication with the subframe, an impeller chamber in receptive communication with said outlet and a rotary undershot impeller operable within said chamber, with the shaft of said impeller arranged in parallelism to said outlet; a conveyor on the subframe at the rear of and in a direct receiving relation to the cutting mechanism, and for advancing harvested elements into the feeder housing and through its outlet and for distribution across the width of the peripheral face of the impeller; a thrashing chamber on the main frame above and beyond the impeller chamber and the impeller, and in direct communication with the separator, and thrashing mechanism in the thrashing chamber, a passage communicating from the feeder housing under the impeller and thence upwardly to the thrashing chamber; the peripheral blades of the impeller serving during rotation to strike downwardly towards and into advanced harvested elements and strip said elements from the conveyor, and impel them through the upwardly directing passage for distribution upon the thrashing mechanism for thrashing and ejection directly into the separator.

26. A combination harvester, thrasher and separator including a main frame, a subframe hinged on the main frame, means on the main frame for raising and lowering the subframe; cutting mechanism extending transversely of the machine at the front of the subframe, a feeder housing and outlet in receptive communication with the subframe, an impeller chamber in receptive communication with said outlet and a rotary impeller operable within said chamber and having a shaft in parallelism with said outlet; a conveyor on the subframe at the rear of and in a direct receiving relation to the cutting mechanism, and for advancing harvested elements into the feeder housing and through its outlet and for distribution across the width of the peripheral face of the impeller; a thrashing chamber on the main frame above and beyond the impeller chamber and in direct communication with the separator, and thrashing mechanism in the thrashing chamber; the impeller being rotatable at a lesser velocity than the thrashing cylinder, and the shafts of said elements being arranged in parallelism with the shaft of the impeller lower than the shaft of the cylinder; a passage communicating from the feeder housing through its outlet into the impeller chamber and thence upwardly to the higher thrashing chamber, the peripheral blades of the undershot impeller, running close to the conveyor during rotation, functioning to strike downwardly towards and into advanced harvested elements and strip said elements off and away from the conveyor, and carry said elements under the impeller, and then impel same upwardly through the directing passage to impinge upon and be thrashed by the thrashing cylinder, and be thence directly thrown off by said cylinder into the separator.

WILLIAM C. EDWARDS, Jr.